US010114390B2

(12) United States Patent
Chen et al.

(10) Patent No.: US 10,114,390 B2
(45) Date of Patent: Oct. 30, 2018

(54) FAN CONTROL SYSTEM, COMPUTER SYSTEM, AND FAN CONTROLLING METHOD THEREOF

(71) Applicant: Wistron Corporation, New Taipei (TW)

(72) Inventors: Po-Chuan Chen, New Taipei (TW); Shih-Huai Cho, New Taipei (TW)

(73) Assignee: WISTRON CORPORATION, New Taipei (TW)

( * ) Notice: Subject to any disclaimer, the term of this patent is extended or adjusted under 35 U.S.C. 154(b) by 402 days.

(21) Appl. No.: 14/051,948

(22) Filed: Oct. 11, 2013

(65) Prior Publication Data

US 2014/0139165 A1 May 22, 2014

(30) Foreign Application Priority Data

Nov. 19, 2012 (TW) .............................. 101143143 A

(51) Int. Cl.
| H02P 25/18 | (2006.01) |
| G06F 1/20 | (2006.01) |
| H02P 6/17 | (2016.01) |
| G05D 23/19 | (2006.01) |

(52) U.S. Cl.
CPC ......... *G05D 23/1919* (2013.01); *G06F 1/206* (2013.01)

(58) Field of Classification Search
CPC ........... G06F 1/206; H02P 25/184; H02P 6/17
USPC ..................... 361/679.48, 688, 695; 165/247
See application file for complete search history.

(56) References Cited

U.S. PATENT DOCUMENTS

| 4,622,499 A | * | 11/1986 | Squires ..................... H02P 6/17 318/269 |
| 6,476,683 B1 | * | 11/2002 | Saito ..................... H02M 3/155 315/291 |
| 8,140,196 B2 | * | 3/2012 | Rozzi et al. .................. 700/300 |
| 2002/0171986 A1 | * | 11/2002 | Figueroa ............ H05K 7/20909 361/93.1 |
| 2003/0156385 A1 | * | 8/2003 | Askeland ................ G06F 1/182 361/679.51 |

(Continued)

FOREIGN PATENT DOCUMENTS

| CN | 1369759 A | 9/2002 |
| CN | 1466044 A | * 1/2004 |

(Continued)

*Primary Examiner* — Eduardo Colon Santana
*Assistant Examiner* — Cortez Cook
(74) *Attorney, Agent, or Firm* — Muncy, Geissler, Olds & Lowe, P.C.

(57) ABSTRACT

A fan control system, a computer system, and a fan controlling method thereof are disclosed. The fan control system is used in the computer system for controlling a fan device. The fan controlling method includes the following steps: obtaining a temperature value of the computer system; determining whether the temperature value of the computer system is larger than or equal to a predetermined temperature value; if yes, controlling a rotation speed of the fan device according to the temperature value; if no, further obtaining a current value via a heat generating electronic component of the computer system; determining whether the current value of the computer system is larger than or equal to a predetermined current value; and if yes, changing the rotation speed of the fan device according to a variation of the current value.

8 Claims, 3 Drawing Sheets

(56) References Cited

U.S. PATENT DOCUMENTS

| | | |
|---|---|---|
| 2009/0033258 A1* | 2/2009 | Atarashi .................... 318/400.3 |
| 2010/0064706 A1* | 3/2010 | Hattori et al. ................. 62/157 |
| 2011/0077796 A1* | 3/2011 | Aklilu ................ G05D 23/1917 |
| | | 700/300 |
| 2012/0007531 A1* | 1/2012 | Krishnamoorthy et al. ................ |
| | | 318/472 |
| 2012/0009863 A1* | 1/2012 | Sun .......................... H02P 6/06 |
| | | 454/228 |
| 2012/0038309 A1* | 2/2012 | Zahora ................. H02P 25/184 |
| | | 318/771 |
| 2012/0181963 A1* | 7/2012 | Wang ....................... H02P 6/22 |
| | | 318/400.33 |
| 2012/0209449 A1* | 8/2012 | Alon ...................... G06F 1/206 |
| | | 700/300 |
| 2012/0230843 A1* | 9/2012 | Ravipati ............ G05D 23/1932 |
| | | 417/46 |
| 2013/0099712 A1* | 4/2013 | Chiu .................... F04D 27/004 |
| | | 318/452 |

FOREIGN PATENT DOCUMENTS

| | | | |
|---|---|---|---|
| CN | 1474062 A | * | 2/2004 |
| CN | 101446295 A | | 6/2009 |
| CN | 102200825 A | | 9/2011 |
| TW | 491529 | | 6/2002 |
| WO | WO2012/122097 A2 | | 9/2012 |

* cited by examiner

FAN CONTROL SYSTEM, COMPUTER SYSTEM, AND FAN CONTROLLING METHOD THEREOF

BACKGROUND OF THE INVENTION

1. Field of the Invention

The present invention relates to a fan control system, a computer system, and a fan controlling method thereof; and more particularly, to a fan control system, a computer system, and a fan controlling method for controlling a fan device according to a temperature value or a current value respectively.

2. Description of the Related Art

With advancements in technology, electronic products nowadays are developed to be lightweight and compact. On the other hand, when the electronic product operates, it generates heat. If there is no adequate cooling system, the electronic product will be damaged because of the increase of the temperature.

The existing central processing unit (CPU) usually controls the cooling fan in accordance with the thermal design power (TDP) configured by the supplier. However, modern dynamic overclocking mechanisms, which can improve the efficiency of the central processing unit effectively, also lead to overheating because the instantaneously increased power of the central processing unit exceeds the thermal design power. Since the fan system of the prior art might not be able to suppress the heat effectively and immediately, the central processing unit will activate the downclocking mechanism automatically to prevent the central processing unit from burning out. Thus, it cannot achieve the objective of overclocking.

Therefore, the prior art usually makes use of increasing the rotation speed of the fan while the electronic product is on standby or makes use of another cooling fan with a better cooling function to cool the central processing unit more rapidly. This approach entails a higher manufacturing cost.

Therefore, it is necessary to invent a new fan control system, a computer system, and a fan controlling method thereof to solve the shortcomings of the prior art.

SUMMARY OF THE INVENTION

A primary object of the present invention is to provide a fan control system that has the effect of controlling a fan device according to a temperature value or current value respectively.

Another object of the present invention is to provide a fan controlling method used in the abovementioned fan control system.

Yet another object of the present invention is to provide a computer system having the abovementioned fan control system.

In order to achieve the abovementioned objects, the fan controlling method of the present invention includes the following steps: obtaining a temperature value of the computer system; determining whether the temperature value of the computer system is larger than or equal to a predetermined temperature value; if yes, controlling a rotation speed of the fan device according to the temperature value; if no, further obtaining a current value via a heat generating electronic component of the computer system; determining whether the current value of the computer system is larger than or equal to a predetermined current value, and if yes, changing the rotation speed of the fan device according to the variation of the current value.

The fan control system of the present invention is applied to a computer system with a heat generating electronic component to control a fan device. The fan control system includes a temperature sensing module, a current detecting module, and a management module. The temperature sensing module is used for detecting a temperature value of the computer system. The current detecting module is used for detecting the current value via the heat generating electronic component of the computer system. The management module is electrically connected to the temperature sensing module, the current detecting module, and the fan device, wherein when the management module determines that the temperature value of the computer system is smaller than the predetermined temperature value, the management module further determines whether the current value is larger than or equal to the predetermined current value. If yes, then the management module changes the rotation speed of the fan device according to the variation of the current value.

The computer system of the present invention includes a heat generating electronic component, a fan device, and a fan control system. The fan device is used for cooling the heat generating electronic component. The fan control system is used for controlling the fan device. The fan control system includes a temperature sensing module, a current detecting module, and a management module. The temperature sensing module is used for detecting a temperature value of the computer system. The current detecting module is used for detecting a current value of the heat generating electronic component. The management module is electrically connected to the temperature sensing module, the current detecting module, and the fan device. The management module includes a first determining module, a second determining module, and a fan control unit. The first determining module is electrically connected to the temperature sensing module for receiving the temperature value measured by the temperature sensing module and determining whether the temperature value is larger than or equal to the predetermined temperature value. The second determining module is electrically connected to the current detecting module for receiving the current value measured by the current detecting module and determining whether the current value is larger than or equal to the predetermined current value. The fan control unit is electrically connected to the fan device, the first determining module, and the second determining module for controlling the rotation of the fan device, wherein when the first determining module determines that the temperature value of the heat generating electronic component is larger than or equal to the predetermined temperature value, the first determining module generates a first control signal to the fan control unit for controlling the rotation speed of the fan device according to the temperature value; when the temperature value of the heat generating electronic component is smaller than the predetermined temperature value, the second determining module further determines whether the current value is larger than or equal to the predetermined current value, and if yes, then the second determining module generates a second control signal to the fan control unit for changing the rotation speed of the fan device according to the variation of the current value.

DETAILED DESCRIPTION OF THE PREFERRED EMBODIMENTS

The abovementioned objects, characteristics, and advantages of the present invention will become more apparent from the following detailed descriptions of a concrete embodiment when taken together with the accompanying drawings.

Figure 1:
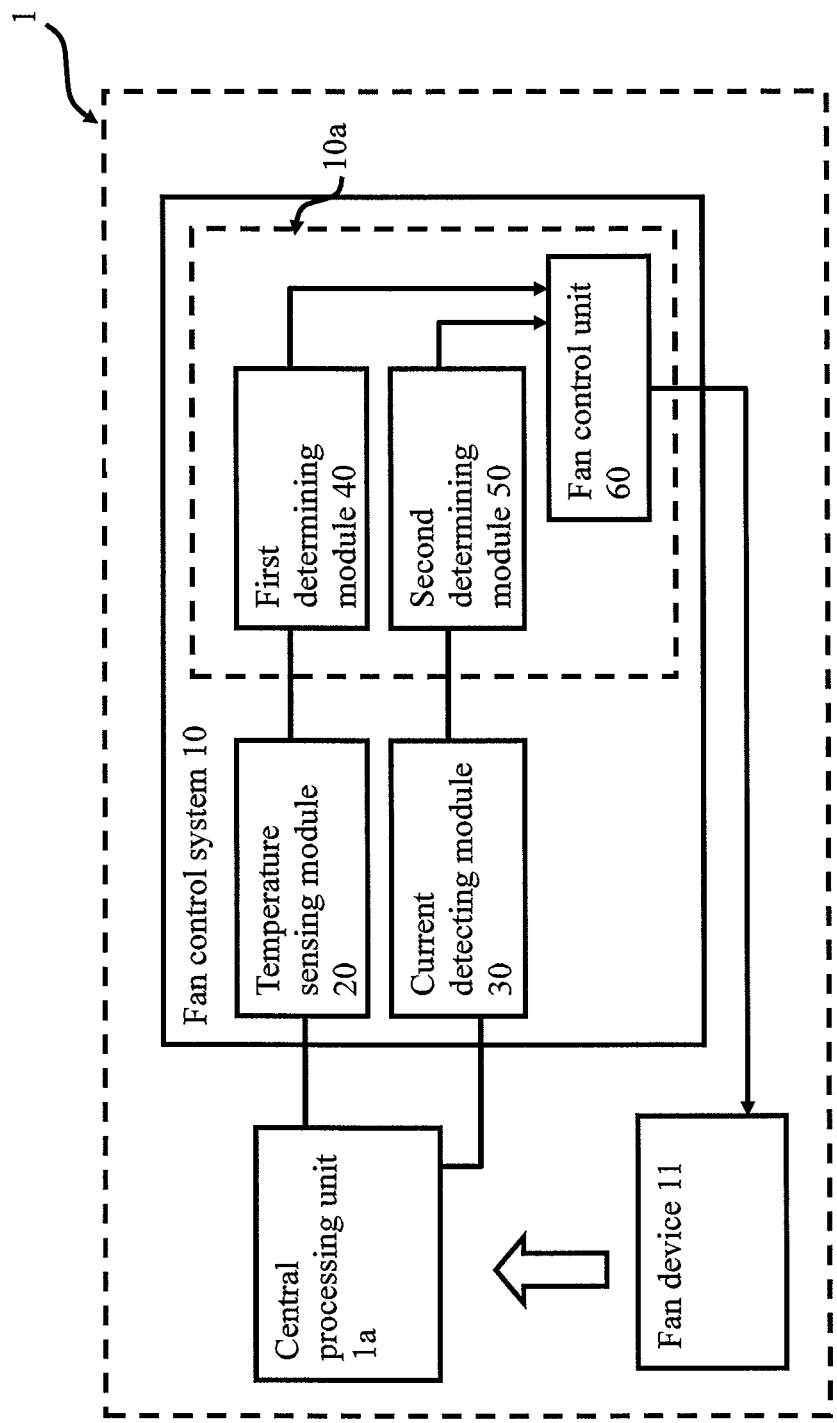
FIG. 1 is a system architecture diagram illustrating the fan control system of the present invention.

First please refer to FIG. 1, which is a system architecture diagram illustrating the fan control system of the present invention.

The fan control system 10 of the present invention is applied to a computer system 1 for controlling the rotation of a fan device 11 inside the computer system 1, such that the fan device 11 can lower the temperatures of the computer system 1 and a heat generating electronic component inside. The computer system 1 can be a notebook computer or a desktop computer, or the computer system 1 can be any other computer system with a cooling requirement, but the present invention is not limited to this aspect. The fan device 11 can be a blade fan or a piezoelectric fan operated according to the control of the fan control system 10 and can further generate airflow. As the operation principle of the blade fan or piezoelectric fan is generally applied by persons having ordinary skill in the art of the present invention, it is not described in detail here.

The fan control system 10 includes a temperature sensing module 20, a current detecting module 30, and a management module 10a, wherein the management module 10a includes a first determining module 40, a second determining module 50, and a fan control unit 60. In a preferred embodiment of the present invention, the temperature sensing module 20 and the current detecting module 30 are used to detect the temperature value and current value of the central processing unit 1a, but the present invention is not limited to this aspect; the temperature sensing module 20 and the current detecting module 30 can be also used to measure the temperature value and current value of the other components of the computer system 1, such that the fan control system 10 can cool the other components of the computer system 1. Therefore, in a preferred embodiment of the present invention, the temperature sensing module 20 can be a diode disposed inside the central processing unit 1a for measuring the temperature value of the central processing unit 1a directly, and transforming the temperature value into a digital signal to be transmitted to the first determining module 40 of the management module 10a. The temperature sensing module 20 can also be used to measure the environmental temperature that influences the central processing unit 1a, but the present invention is not limited to the environment in which the temperature sensing module 20 can be used. Similarly, the current detecting module 30 is used to measure the current value of the central processing unit 1a and to transmit the current value to the second determining module 50 of the management module 10a.

The management module 10a includes a first determining module 40, a second determining module 50, and a fan control unit 60. The management module 10a can be a single chip; therefore, the first determining module 40, the second determining module 50, and the fan control unit can be designed inside the same chip by hardware or firmware with hardware; for example, it can be designed inside the baseboard management controller (BMC), but the present invention is not limited to this aspect. The first determining module 40, the second determining module 50, and the fan control unit 60 can be also designed inside different chips and electrically connected to one another.

The first determining module 40 is electrically connected to the temperature sensing module 20 for determining whether a first control signal is sent to the fan control unit 60 to control the rotation of the fan device 11 according to the temperature value detected by the temperature sensing module 20. The first determining module 40 can be a proportional-integral-derivative (PID) control module, but the present invention is not limited to this controlling method. Thus, when the temperature value of the central processing unit 1a is larger than or equal to the predetermined temperature value, the first determining module 40 controls the rotation of the fan device 11 through the fan control unit 60. The predetermined temperature value is configured according to the variable thermal design power (TDP) of the central processing unit 1a, but the present invention is not limited to this aspect.

The second determining module 50 is electrically connected to the current detecting module 30 for receiving the current value measured by the current detecting module 30. When the temperature value of the central processing unit 1a is not larger than or is not equal to the predetermined temperature value, the second determining module 50 then determines whether the current value is larger than or equal to the predetermined current value and thus determines if it needs to generate a second control signal to the fan control unit 60 to control the rotation of the fan device 11. The fan control unit 60 is connected with the fan device 11; when the fan control unit 60 receives the first control signal or the second control signal, it can control the rotation and rotation speed of the fan device 11 by making use of the pulse width modulation (PWM) signal.

Figure 2:
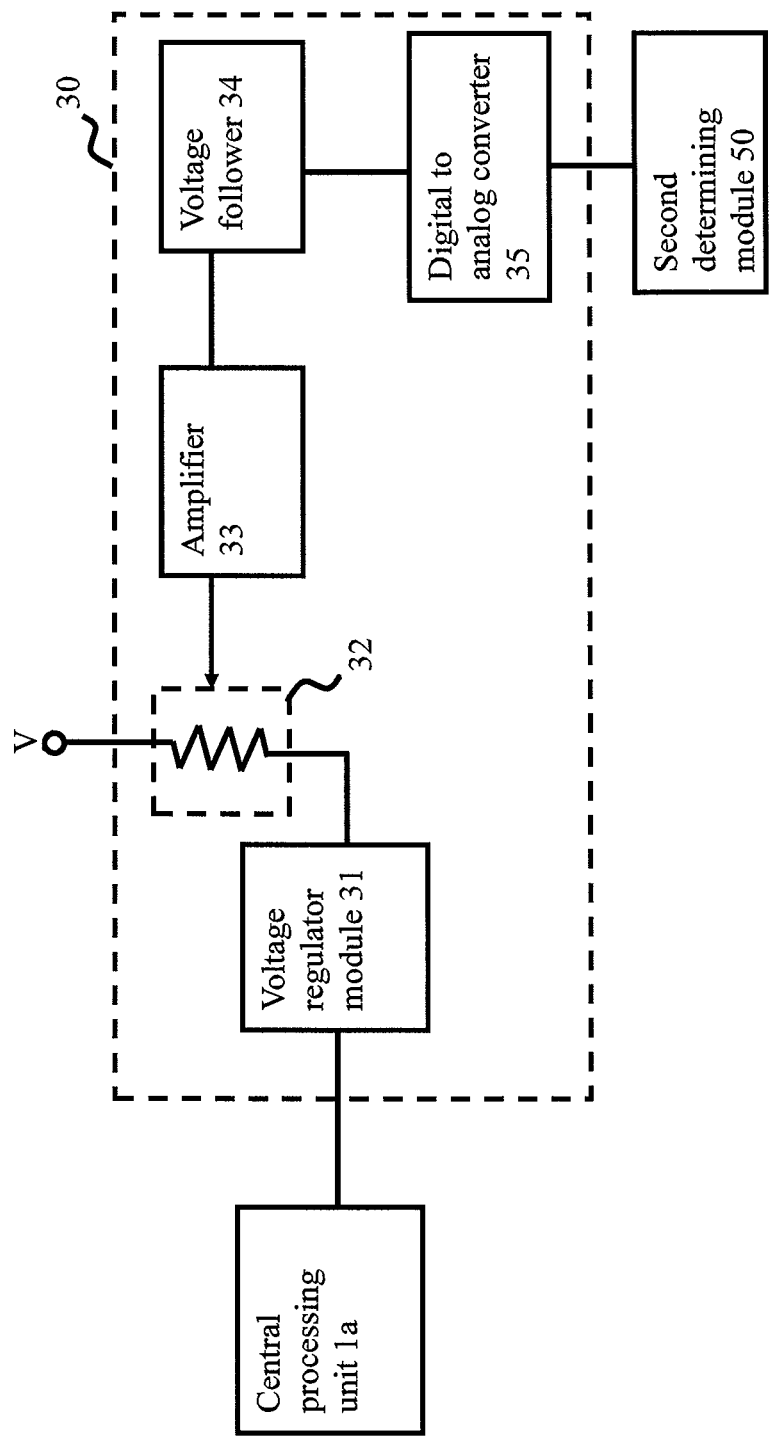
FIG. 2 is a circuit architecture diagram illustrating the current detecting module according to one embodiment of the present invention.

Now please refer to FIG. 2, which is a circuit architecture diagram illustrating the current detecting module according to one embodiment of the present invention.

In one embodiment of the present invention, the current detecting module 30 includes a voltage regulator module (VRM) 31, a sensing resistor 32, an amplifier 33, a voltage follower 34, and a digital to analog converter 35. The voltage regulator module 31 is electrically connected to the central processing unit 1a for adjusting and supplying an adequate power signal to the central processing unit 1a according to the required power of the central processing unit 1a. The sensing resistor 32 is electrically connected to the power input end V and the voltage regulator module 31 for receiving the power signal from the power input end V, for example, a power signal of 12 volts, and then transmitting the power signal to the input end of the voltage regulator module 31. The voltage regulator module 31 then transforms and adjusts the power signal of the central processing unit 1a. Therefore, when the current value of the required power signal of the central processing unit 1a is changed, the current value passing through the sensing resistor 32 is also changed, such that the voltage difference of both ends of the sensing resistor 32 is also changed at the same time. As a result, the sensing resistor 32 can generate a voltage difference signal. The amplifier 33 is electrically connected to the sensing resistor 32 for amplifying the required multiple of the voltage difference signal generated by the sensing resistor 32. The voltage follower 34 is electrically connected to the amplifier 33 for separating and buffering the signal.

Therefore, when the voltage difference signal passes through the voltage follower 34, the voltage follower 34 can avoid the interference signal from outside. The digital to analog converter 35 is electrically connected to the voltage follower 34 for receiving the voltage difference signal and transforming the analog voltage difference signal into a digital voltage difference signal, and then for transmitting to the second determining module 50 finally. As a result, the second determining module 50 can estimate the current value of the central processing unit 1a from the voltage difference signal.

What should be noted is that the circuit architecture diagram illustrating the current detecting module in FIG. 2 is provided for illustration only; the present invention is not limited to the abovementioned circuit to achieve the object of detecting the current value, and as the abovementioned operation method of each module is generally applied by persons having ordinary skill in the art of the present invention, no detailed description is necessary here.

Figure 3:
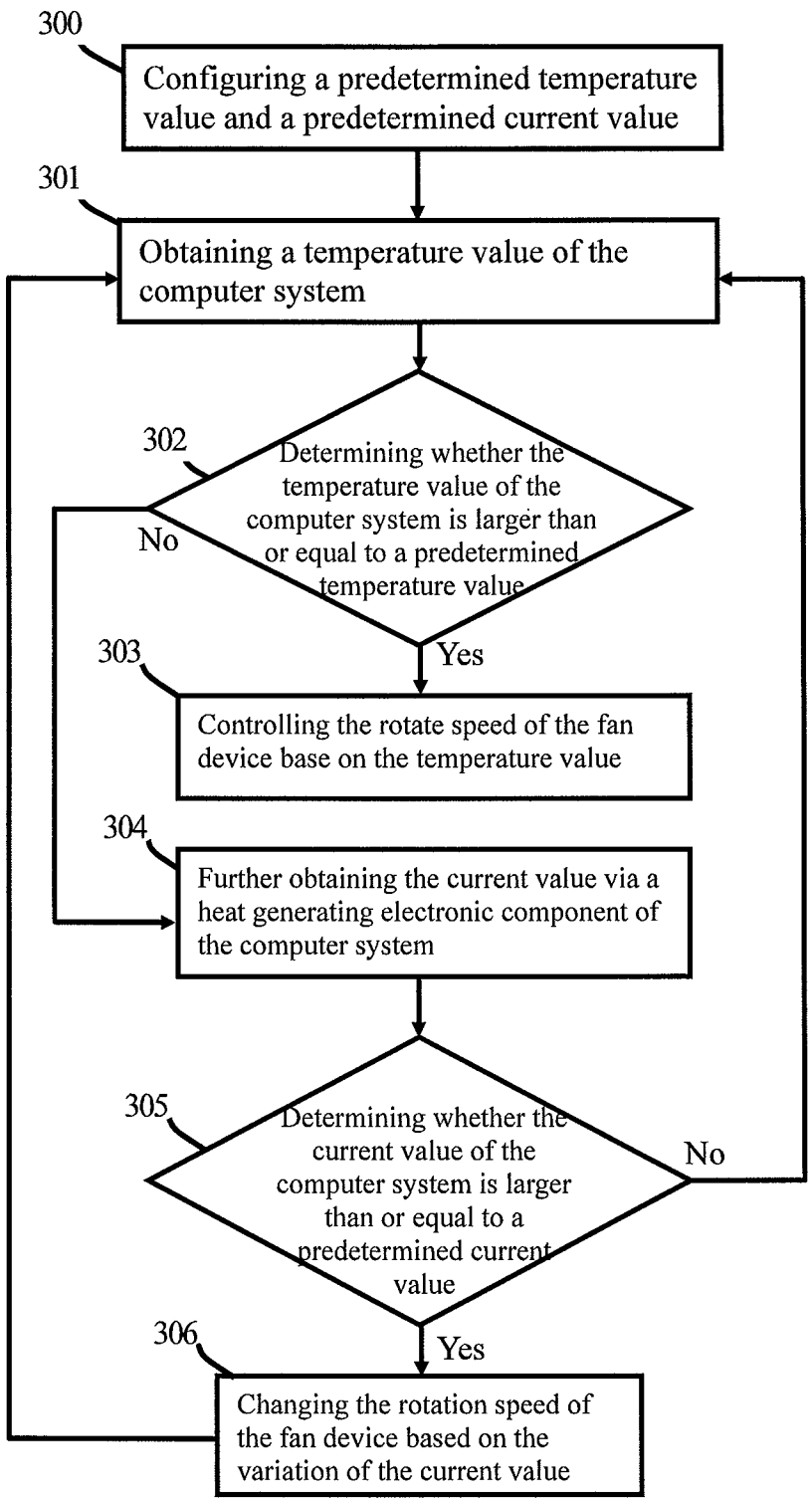
FIG. 3 is a procedure flowchart illustrating the fan controlling method according to one embodiment of the present invention.

Next please refer to FIG. 3, which is a procedure flowchart illustrating the fan controlling method according to one embodiment of the present invention. What should be noted here is that although the following uses the fan control system 10 of the computer system 1 as an illustration for explaining the fan controlling method of the present invention, the fan controlling method of the present invention is not limited to the usage of the fan control system 10.

First, the method proceeds with step 300: configuring a predetermined temperature value and a predetermined current value.

The first determining module 40 configures the predetermined temperature value for rotation of the fan device 11. The predetermined temperature value is according to the different thermal design power (TDP) of the central processing unit 1a, for example, it can be configured to be plus and minus 5 degrees centigrade of the critical temperature of the central processing unit 1a, but the present invention is not limited to this aspect. In addition, the second determining module 50 also configures the predetermined current value for rotation of the fan device 11; for example, it can be configured to control the rotation of fan device 11 as long as there is current passing through the central processing unit 1a, or configure the required current value for executing overclocking of the central processing unit 1a as a predetermined current value, but the present invention is not limited to this aspect.

Next, the method proceeds with step 301: obtaining a temperature value of the computer system.

The temperature sensing module 20 detects the temperature value of the central processing unit 1a of the computer system 1 for the first determining module 40 to confirm whether the temperature of the central processing unit 1a needs to be lowered.

The method continues with step 302: determining whether the temperature value of the computer system is larger than or equal to a predetermined temperature value.

The first determining module 40 determines whether the temperature value of the central processing unit 1a is larger than or equal to the predetermined temperature value. The predetermined temperature value can be the critical temperature that may cause damage to the central processing unit 1a, but the present invention is not limited to this aspect.

If the temperature value of the central processing unit 1a is larger than or equal to the predetermined temperature value, then the method proceeds with step 303: controlling the rotation speed of the fan device according to the temperature value.

In order to prevent damage to the central processing unit 1a due to overheating, the first determining module 40 generates a first control signal to the fan control unit 60 according to the temperature value of the central processing unit 1a to control the blade of the fan device 11 to start rotating so as to lower the temperature of the central processing unit 1a. In the mean time, the first determining module 40 can use the PID controlling method to adjust the rotation speed of the fan device 11 dynamically in accordance with the temperature value of the central processing unit 1a. When the temperature value of the central processing unit 1a rises, the first determining module 40 also controls the fan control unit 60 to increase the rotation speed of the fan device 11 so as to lower the temperature of the central processing unit 1a effectively.

If the temperature value of the central processing unit 1a is not larger than or not equal to the predetermined temperature value, it means the temperature value of the central processing unit 1a has not reached the critical temperature yet and thus is still within the safety range. At this moment, the method proceeds with step 304: further obtaining the current value via a heat generating electronic component of the computer system.

At this moment, the current detecting module 30 can detect the current value passing through the central processing unit 1a.

The method further proceeds with step 305: determining whether the current value of the computer system is larger than or equal to a predetermined current value.

After the current detecting module 30 detects the current value of the central processing unit 1a, the second determining module 50 determines whether the current value of the central processing unit 1a is larger than or equal to the predetermined current value to confirm whether the central processing unit 1a is consuming power.

When the current value of the central processing unit 1a is smaller than the predetermined current value, it means that the central processing unit 1a either is not consuming any power or is consuming only a small amount of power; thus, the method returns to step 301 to re-detect the temperature value of the central processing unit 1a.

On the other hand, when the current value of the central processing unit 1a is already larger than or equal to the predetermined current value, then the method proceeds with step 306: changing the rotation speed of the fan device according to the variation of the current value.

Under such circumstances, the central processing unit 1a is consuming power by starting operations or executing the overclocking procedure; thus, the second determining module 50 will generate a second control signal and enable the fan device 11 to rotate through the fan control unit 60. Also, the second determining module 50 will adjust the rotation speed of the fan device 11 by controlling the fan control unit 60 in accordance with the variation of the current value of the central processing unit 1a; for example, the second determining module 50 may increase the rotation speed of the fan device 11 according to the increase of the current value of the central processing unit 1a. As a result, the fan control system 10 of the present invention can lower the temperature of the central processing unit 1a at any time to enhance the cooling capability of the fan device 11 effectively and rapidly so as to dispel the extra heat of the central processing unit 1a caused by overclocking.

The method finally returns to step 301 to re-detect the temperature value of the Central Processing Unit 1a.

What should be noted here is that the fan controlling method of the present invention is not limited to the order of the abovementioned steps; the order of the abovementioned steps can be also changed as long as it can achieve the objects of the present invention.

Therefore, the fan control system 10 of the present invention determines the temperature value of the central processing unit 1a first, and then determines the current value of the central processing unit 1a to lower the temperature of the central processing unit 1a effectively by assigning the determination of temperature a high priority without needing to consider the temperature value and current value at the same time. The fan control system 10 of the present invention will adjust the rotation speed of the fan device 11 in accordance with the power of the central processing unit 1a, but it will not affect the efficiency of the central processing unit 1a when the central processing unit 1a is in overclocking mode.

To sum up, the present invention has characteristics that are different from the prior arts in terms of the objects, means, and function. What should be noted is that the abovementioned embodiments are provided for illustration only, and not for the purpose of limiting the scope of the invention as defined by the appended claims.

What is claimed is:

1. A fan controlling method, which is applied to a computer system with a heat generating electronic component to control a fan device, wherein the heat generating electronic component is a central processing unit, the method comprising:

obtaining a temperature value of the computer system;

determining whether the temperature value of the computer system is larger than or equal to a predetermined temperature value;

if the temperature value of the computer system is larger than or equal to the predetermined temperature value, controlling a rotation speed of the fan device according to the temperature value and increasing the rotation speed of the fan device according to an increase of the temperature value;

if the temperature value of the computer system is smaller than the predetermined temperature value, further obtaining a current value of the central processing unit of the computer system to determine whether the current value of the computer system is larger than or equal to a predetermined current value, comprising:

by using a sensing resistor electrically connected to a power input end, receiving a power signal from the power input end;

by using a voltage regulator module electrically connected to the sensing resistor and the central processing unit, providing a required power signal to the central processing unit by the power signal and having a voltage difference signal according to a required current value of the central processing unit;

by using an amplifier electrically connected to the sensing resistor, amplifying the voltage difference signal;

by using a voltage follower electrically connected to the amplifier, receiving the voltage difference signal and separating an interference signal;

by using a digital to analog converter electrically connected to the voltage follower, converting the voltage difference signal to a digital voltage difference signal so as to know the current value;

and by using a management module electrically connected to a temperature sensing module, a current detecting module, and the fan device, if the temperature value of the computer system is smaller than the predetermined temperature value and the current value of the computer system is larger than or equal to the predetermined current value, increasing a rotation speed of the fan device according to an increase of the current value.

2. The fan controlling method as claimed in claim 1, wherein the step of obtaining the temperature value of the computer system comprises:

obtaining the temperature value of the central processing unit.

3. A fan control system that is applied to a computer system with a heat generating electronic component to control a fan device, wherein the heat generating electronic component is a central processing unit, the fan control system comprising:

a temperature sensing module for detecting a temperature value of the computer system;

a current detecting module for detecting a current value of the central processing unit of the computer system; wherein the current detecting module comprises:

a sensing resistor electrically connected to a power input end for receiving a power signal from the power input end;

a voltage regulator module electrically connected to the sensing resistor and the central processing unit, wherein the power signal is transmitted to the voltage regulator module through the sensing resistor and the voltage regulator module provides the required power signal to the central processing unit accordingly, at the same time, to enable both ends of the sensing resistor to have a voltage difference signal according to a required current value of the central processing unit;

an amplifier electrically connected to the sensing resistor for amplifying the voltage difference signal;

a voltage follower electrically connected to the amplifier for receiving the voltage difference signal and separating an interference signal; and a digital to analog converter electrically connected to the voltage follower for converting the voltage difference signal to a digital voltage difference signal so as to know the current value; and a management module electrically connected to the temperature sensing module, the current detecting module, and the fan device, wherein when the management module determines that the temperature value of the computer system is smaller than the predetermined temperature value, the management module further determines whether the current value is larger than or equal to the predetermined current value, and if the temperature value of the computer system is smaller than the predetermined temperature value and the current value of the computer system is larger than or equal to the predetermined current value, the management module increases a rotation speed of the fan device according to an increase of the current value.

4. The fan control system as claimed in claim 3, wherein the management module comprises:

a first determining module electrically connected to the temperature sensing module for receiving the temperature value measured by the temperature sensing module and determining whether the temperature value is larger than or equal to the predetermined temperature value;

a second determining module electrically connected to the current detecting module for receiving the current value measured by the current detecting module and determining whether the current value is larger than or equal to the predetermined current value; and a fan control unit electrically connected to the fan device, the first determining module, and the second determining module for controlling the rotation of the fan device, wherein when the first determining module determines the temperature value of the computer system is larger than or equal to the predetermined temperature value, the first determining module generates a first control signal to the fan control unit for controlling the rotation speed of the fan device according to the temperature value and increasing the rotation speed of the fan device according to an increase of the temperature value; when the first determining module determines the temperature value of the computer system is smaller than the predetermined temperature value, the second determining module further determines whether the current value is larger than or equal to the predetermined current value, and if yes, generates a second control signal to the fan control unit for changing the rotation speed of the fan device according to the variation of the current value and increases the rotation speed of the fan device according to an increase of the current value.

5. The fan control system as claimed in claim 4, wherein the temperature sensing module is used to obtain the temperature value of the central processing unit.

6. The fan control system as claimed in claim 5, wherein the first determining module is a proportional-integral-derivative control module.

7. A computer system, comprising:
a heat generating electronic component, wherein the heat generating electronic component is a central processing unit;
a fan device for cooling the central processing unit; and
a fan control system for controlling the fan device, wherein the fan control system comprises:
  a temperature sensing module for detecting a temperature value of the computer system;
  a current detecting module for detecting a current value of the central processing unit;
wherein the current detecting module comprises:
a sensing resistor electrically connected to a power input end for receiving a power signal from the power input end;
a voltage regulator module electrically connected to the sensing resistor and the central processing unit, wherein the power signal is transmitted to the voltage regulator module through the sensing resistor for providing the required power signal to the central processing unit accordingly, at the same time, to enable both ends of the sensing resistor to have a voltage difference signal according to a required current value of the central processing unit;
an amplifier electrically connected to the sensing resistor for amplifying the voltage difference signal;
a voltage follower electrically connected to the amplifier for receiving the voltage difference signal and separating an interference signal; and
a digital to analog converter electrically connected to the voltage follower for converting the voltage difference signal to a digital voltage difference signal so as to know the current value; and
a management module electrically connected to the temperature sensing module, the current detecting module, and the fan device, wherein the management module comprises:
  a first determining module electrically connected to the temperature sensing module for receiving the temperature value measured by the temperature sensing module and determining whether the temperature is larger than or equal to the predetermined temperature value;
  a second determining module electrically connected to the current detecting module for receiving the current value measured by the current detecting module and determining whether the current value is larger than or equal to the current value; and
  a fan control unit electrically connected to the fan device, the first determining module, and the second determining module for controlling a rotation of the fan device, wherein when the first determining module determines that the temperature value of the heat generating electronic component is larger than or equal to the predetermined temperature value, the first determining module generates a first control signal to the fan control unit for controlling the rotation speed of the fan device according to the temperature value and increasing the rotation speed of the fan device according to an increase of the temperature value; when the temperature of the heat generating electronic component is smaller than the predetermined temperature value, the second determining module further determines whether the current value is larger than or equal to the predetermined current value, and if the temperature value of the computer system is smaller than the predetermined temperature value and the current value of the computer system is larger than or equal to the predetermined current value, then the second determining module generates a second control signal to the fan control unit for increasing a rotation speed of the fan device according to an increase of the current value.

8. The computer system as claimed in claim 7, wherein when the temperature value of the central processing unit is larger than or equal to the predetermined temperature value, the first determining module increases the rotation speed of the fan device according to an increase of the temperature value.

* * * * *